(12) United States Patent
Cho

(10) Patent No.: US 7,865,151 B2
(45) Date of Patent: Jan. 4, 2011

(54) SWING HINGE DEVICE FOR MOBILE TERMINAL

(75) Inventor: Bum-Lai Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1337 days.

(21) Appl. No.: 11/370,364

(22) Filed: Mar. 8, 2006

(65) Prior Publication Data

US 2006/0225249 A1   Oct. 12, 2006

(30) Foreign Application Priority Data

Apr. 6, 2005  (KR) .................... 10-2005-0028567

(51) Int. Cl.
*H04B 1/38*  (2006.01)
(52) U.S. Cl. .............. 455/90.3; 455/566; 455/575.1; 455/575.4; 455/550.1; 455/556.1
(58) Field of Classification Search ................ 455/566, 455/575.1, 575.4, 90.3, 550.1, 556.1
See application file for complete search history.

(56) References Cited

U.S. PATENT DOCUMENTS

| 7,020,495 | B2 * | 3/2006 | Han ......................... 455/566 |
| 7,174,195 | B2 * | 2/2007 | Nagamine ............... 455/575.1 |
| 7,280,857 | B2 * | 10/2007 | Geernaert ............... 455/575.4 |
| 7,419,099 | B2 * | 9/2008 | Lee et al. ............... 235/472.01 |
| 2003/0013417 | A1 | 1/2003 | Bum |
| 2004/0121826 | A1 | 6/2004 | Ma et al. |
| 2004/0192398 | A1 * | 9/2004 | Zhu ......................... 455/566 |
| 2005/0054393 | A1 * | 3/2005 | Fagerstrom et al. ...... 455/575.1 |
| 2005/0137000 | A1 | 6/2005 | Toh et al. |
| 2005/0266898 | A1 * | 12/2005 | Ahn et al. ............... 455/575.1 |

FOREIGN PATENT DOCUMENTS

| CN | 1645998 | 7/2005 |
| EP | 1 594 292 | 11/2005 |
| EP | 1 666 743 | 6/2006 |
| KR | 20-0342541 | 2/2004 |
| WO | WO 2005-026562 | 3/2005 |

* cited by examiner

*Primary Examiner*—Matthew D Anderson
*Assistant Examiner*—April G Gonzales
(74) *Attorney, Agent, or Firm*—The Farrell Law Firm, LLP

(57) ABSTRACT

Disclosed is a swing hinge device for semi-automatically rotating a pair of facing housings of a mobile terminal on a step-by-step basis, for use in a mobile terminal having a first housing and a second housing with a display unit rotatable around a hinge axis extending in a direction perpendicular to a top surface of the first housing, the swing hinge device includes a rotation member rotatable around the hinge axis; a plate-type swing hinge member rotatably connected to the rotation member to semi-automatically rotate the rotation member on a step-by-step basis; a power supply means mounted in the swing hinge member to supply power for semi-automatically rotating the rotation member; and at least one swing locking means formed along the perimeter of the swing hinge member to lock or release the rotation member for the step-by-step interrupted rotation of the rotation member.

16 Claims, 16 Drawing Sheets

SWING HINGE DEVICE FOR MOBILE TERMINAL

PRIORITY

This application claims priority to an application entitled "Swing Hinge Device for Mobile Terminal" filed with the Korean Intellectual Property Office on Apr. 6, 2005 and assigned Ser. No. 2005-28567, the contents of which are incorporated herein by reference.

BACKGROUND OF THE INVENTION

1. Field of the Invention

The present invention relates to a swing hinge device for a mobile terminal, and more particularly to a swing hinge device configured to semi-automatically rotate and open a pair of facing housings of a mobile terminal.

2. Description of the Related Art

Generally, "mobile terminal" refers to a portable communication device used for wireless communications, such as a hand-held phone (HHP), CT-2 phone, digital phone, PCS phone and PDA. Mobile terminals can be classified into a bar type, a flip type and a folder type according to their shapes. A bar-type mobile terminal has a bar-shaped single housing. A flip-type mobile terminal has a bar-shaped housing and a flip cover rotatably connected to the housing. A folder-type mobile terminal has a bar-shaped main housing and a folder rotatable about the main housing to be opened or closed.

The above types of mobile terminals essentially include an antenna, data input/output means and data transmission/receiving means. A keypad for inputting data by pressing keys is generally used as a data input means. Alternatively, a touch pad or a touch screen can be used.

As a data output means, an LCD is generally used to display data.

Flip type or folder type mobile terminals have been keeping pace with the current trends in electronic elements to have a high sound sensitivity, as well as a light and compact size.

Recently, new designs such as a slide type and a swing type have been launched to meet the diverse needs and tastes of users. The slide type and the swing type have a pair of facing housings, one of which slides up or swivels on the other housing. Folder and swing type combined terminals have also been developed to improve user convenience.

However, conventional types of mobile terminals provide no specific means for actuating an open/close operation. To perform a voice communication on a swing type mobile terminal, a user has to rotate one housing by manual operation to an angle sufficient to open the other housing.

In addition, a conventional swing type mobile terminal uses a cylindrical hinge device. The mobile terminal requires a sufficient thickness corresponding to the height of the cylindrical hinge device, which increases the size of the mobile terminal, going against the demand for a smaller and lighter design.

SUMMARY OF THE INVENTION

Accordingly, the present invention has been made to solve the above-mentioned problems occurring in the prior art, and an object of the present invention is to provide a swing hinge device for easily opening or closing a mobile terminal by semi-automatically rotating a pair of facing housings of the mobile terminal.

Another object of the present invention is to provide a plate-type swing hinge device for use in a slim and small-sized mobile terminal to semi-automatically rotate and open a pair of facing housings.

In order to accomplish the above objects of the present invention, there is provided a swing hinge device for use in a mobile terminal having a first housing and a second housing with a display unit rotatable around a hinge axis extending in a direction perpendicular to a top surface of the first housing, said swing hinge device includes a rotation member rotatable around the hinge axis; a swing hinge member rotatably connected to the rotation member to semi-automatically rotate the rotation member; a power supply means mounted in the swing hinge member to supply power for rotating the rotation member; and at least one swing locking means formed along the perimeter of the swing hinge member to lock or release the rotation member for the rotation of the rotation member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
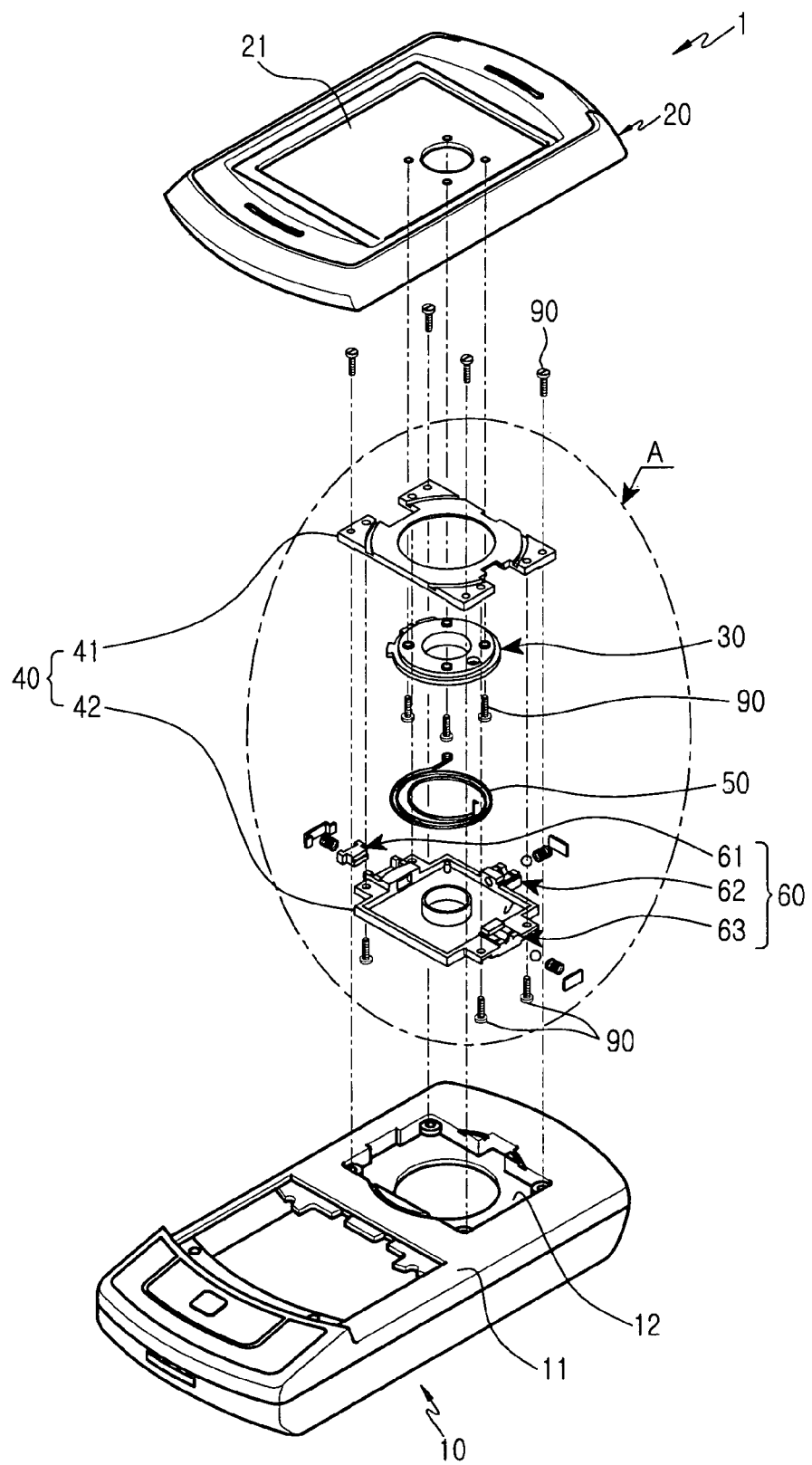
FIG. 1 is an exploded perspective view of a swing hinge device of a mobile terminal according to a preferred embodiment of the present invention.
Figure 2:
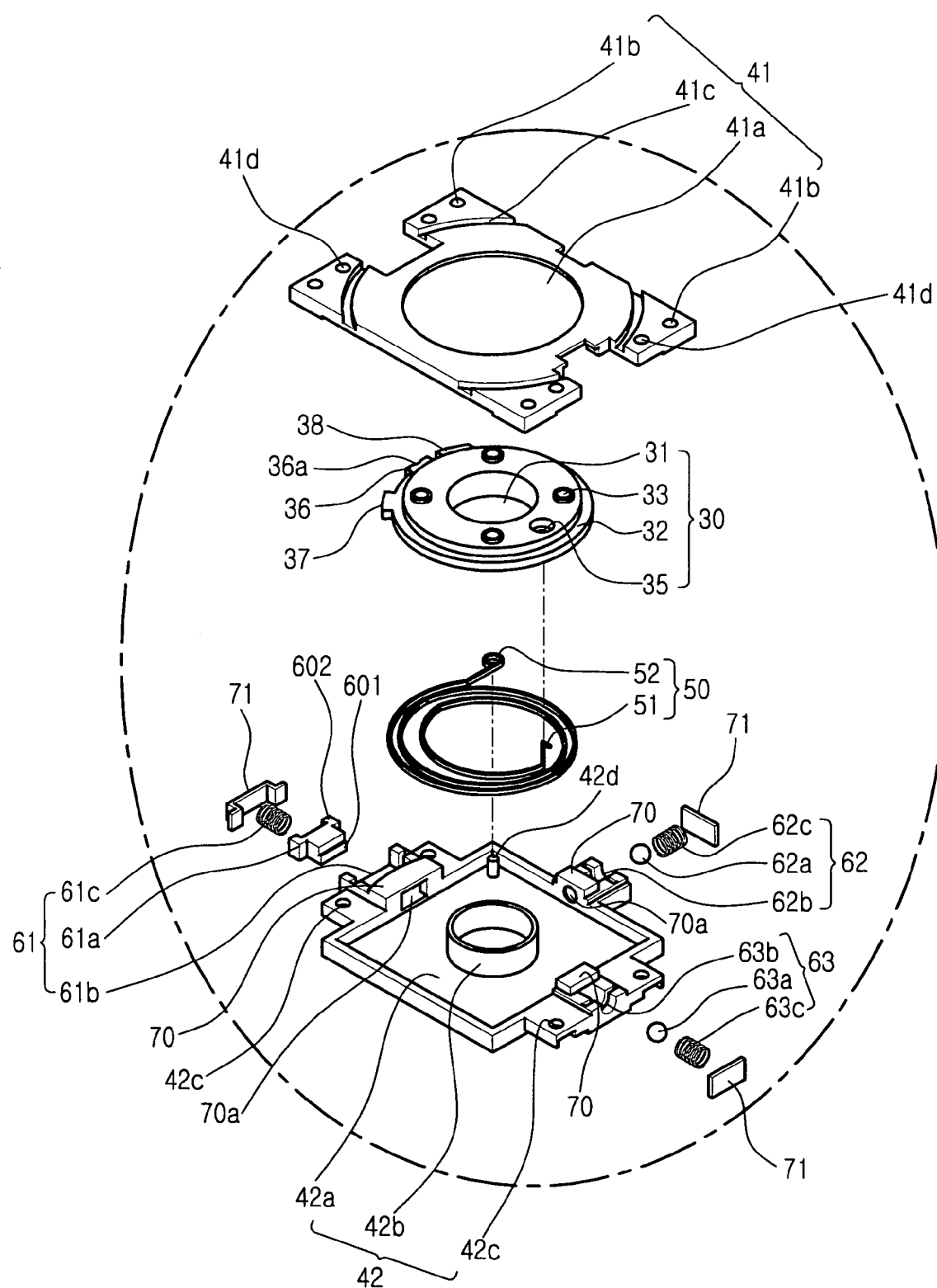
FIG. 2 is an enlarged exploded perspective view of part A in FIG. 1.

Referring to FIGS. 1 and 2, a swing hinge device 1 of a mobile terminal includes a rotation member 30, a swing hinge member 40, a power supply means 50 and at least one swing locking means 60. The rotation member 30 is rotatably mounted in the swing hinge member 40 and connected to a second housing 20 by screws 90 in such a manner that it can rotate around a hinge axis A1 extending in a direction perpendicular to the top surface of a first housing 10. The swing hinge member 40 is connected to the first housing 10 by screws 90 in such a manner that it can semi-automatically rotate the rotation member 30. The power supply means 50 is embedded in the swing hinge member 40 to supply power for semi-automatically rotating the rotation member 30. The swing locking means 60 are formed along the perimeter of the swing hinge member 40 so as to interrupt the rotation of the rotation member 30 during different points of rotation.

Figure 3:
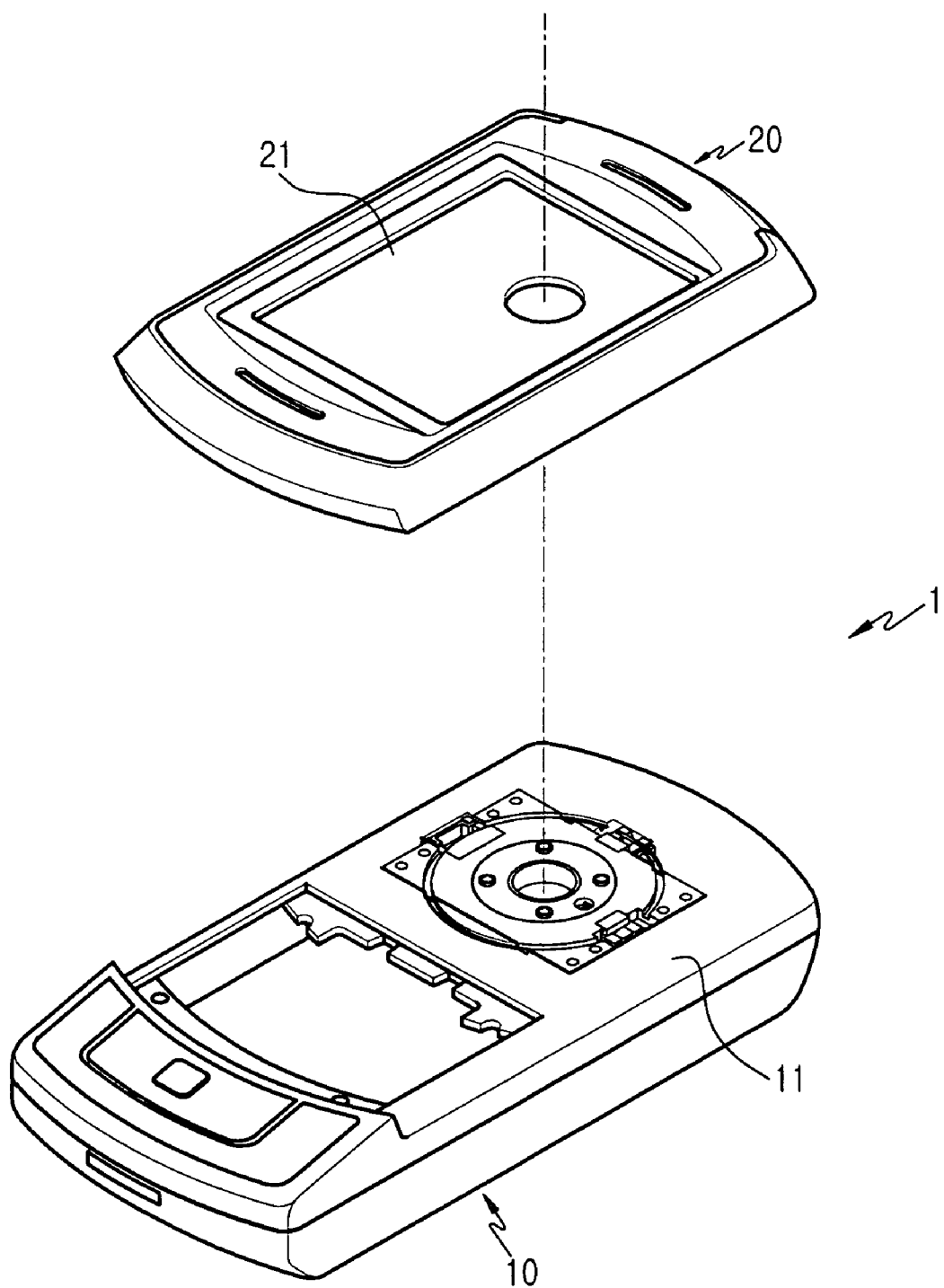
FIG. 3 is a perspective view illustrating separated first and second housings of a mobile terminal having a swing hinge device according to the preferred embodiment of the present invention.

As illustrated in FIG. 3, the first housing 10 is longitudinally extended to be longer than the second housing 20. On the top surface of the first housing 10, a rotation space 11 is provided to let the facing second housing 20 rotate thereon. The rotation space 11 includes a mount groove 12 (See FIG. 1) recessed in a plate shape at a predetermined location to a predetermined depth to mount the plate-type swing hinge member 40 thereon.

As illustrated in FIG. 2, the rotation member 30 is formed in a disc shape. The rotation member 30 has a through hole 31 at the center thereof and a release preventing step 32 at the outer periphery thereof. Due to the release preventing step 32, the rotation member 30, once rotatably inserted into a rotation hole 41a at the center of the swing hinge member 40, is ensured not to be released out from the rotation hole 41a. The rotation member 30 has at least one screw hole 33 to be fixed to the second housing 20 by screws 90.

Figure 6:
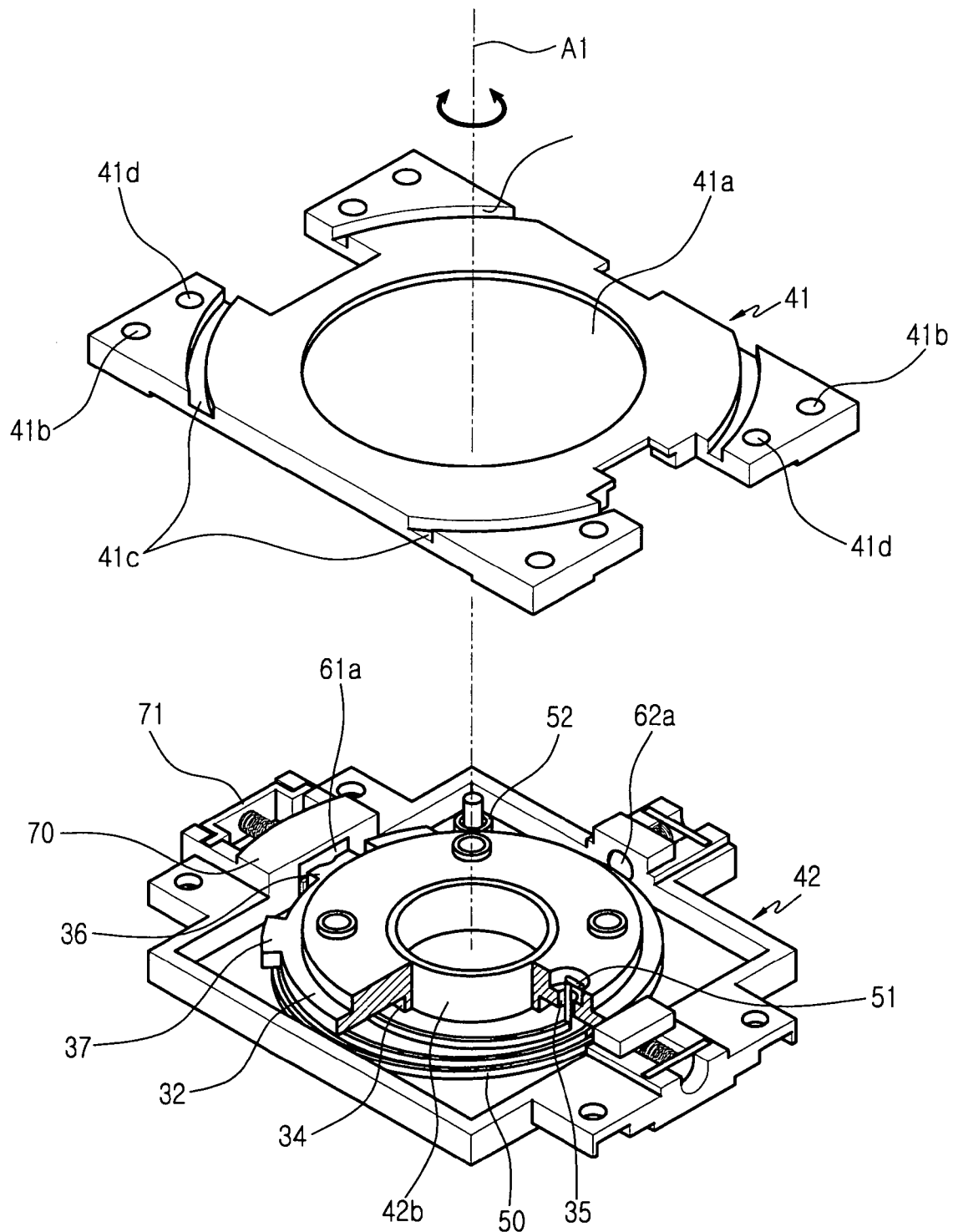
FIG. 6 is a perspective view illustrating a second hinge member of a swing hinge device according to the preferred embodiment of the present invention.

In addition, as illustrated in FIG. 6, the rotation member 30 has a cylindrical rib 34 protruded downward from the bottom thereof to be connected to the swing hinge member 40 and to provide a space for receiving the power supply means 50.

As illustrated in FIG. 6, the swing hinge member 40 consists of plate-type first and second hinge members 41 and 42 for rotatably mounting the rotation member 30 therebetween. The first hinge member 41 includes the rotation hole 41a, at least one pair of first and second screw holes 41b and 41d and a guide groove 41c. The rotation member 30 is rotatably inserted into the rotation hole 41a formed at the center of the first hinge member 41. The first screw hole 41b is formed at the outer perimeter of the rotation hole 41a to fix the first hinge member 41 to the first housing 10 by screws 90. The second screw hole 41d is formed at a position corresponding to a screw hole 42c of the second hinge member 42 to connect the first and second hinge members 41 and 42 by screws 90. A guide projection (not shown) formed on the button surface of the second housing 20 is engaged into the guide groove 41c so that the second housing 20 can rotate according to the guidance of the guide groove 41c.

As illustrated in FIGS. 2 and 6, the plate-type second hinge member 42 has a receiving space 42a for receiving the power supply means 50 and a cylindrical housing 42b protruded at the center thereof. The cylindrical housing 42b is inserted into the through hole 31 of the rotation member 30. Also, at least one screw hole 42c which corresponds to the second screw hole 41d of the first hinge member 41 is formed at the outer perimeter of the receiving space 42a to connect the first and second hinge members 41 and 42 by screws 90.

As illustrated in FIG. 2, the power supply means 50 is a spiral spring 50 that is wound with the rotation of the rotation member 30 to provide an elastic force. One end 51 of the spiral spring 50 is inserted into a spring hole 35 formed on the rotation member 30 to provide an elastic force for the rotation member 30, while the other end 52 is coupled to a spring fixing projection 42d formed in the receiving space 42a of the second hinge member 42.

The swing locking means 60 consists of first, second and third locking means 61, 62 and 63.

Figure 5:
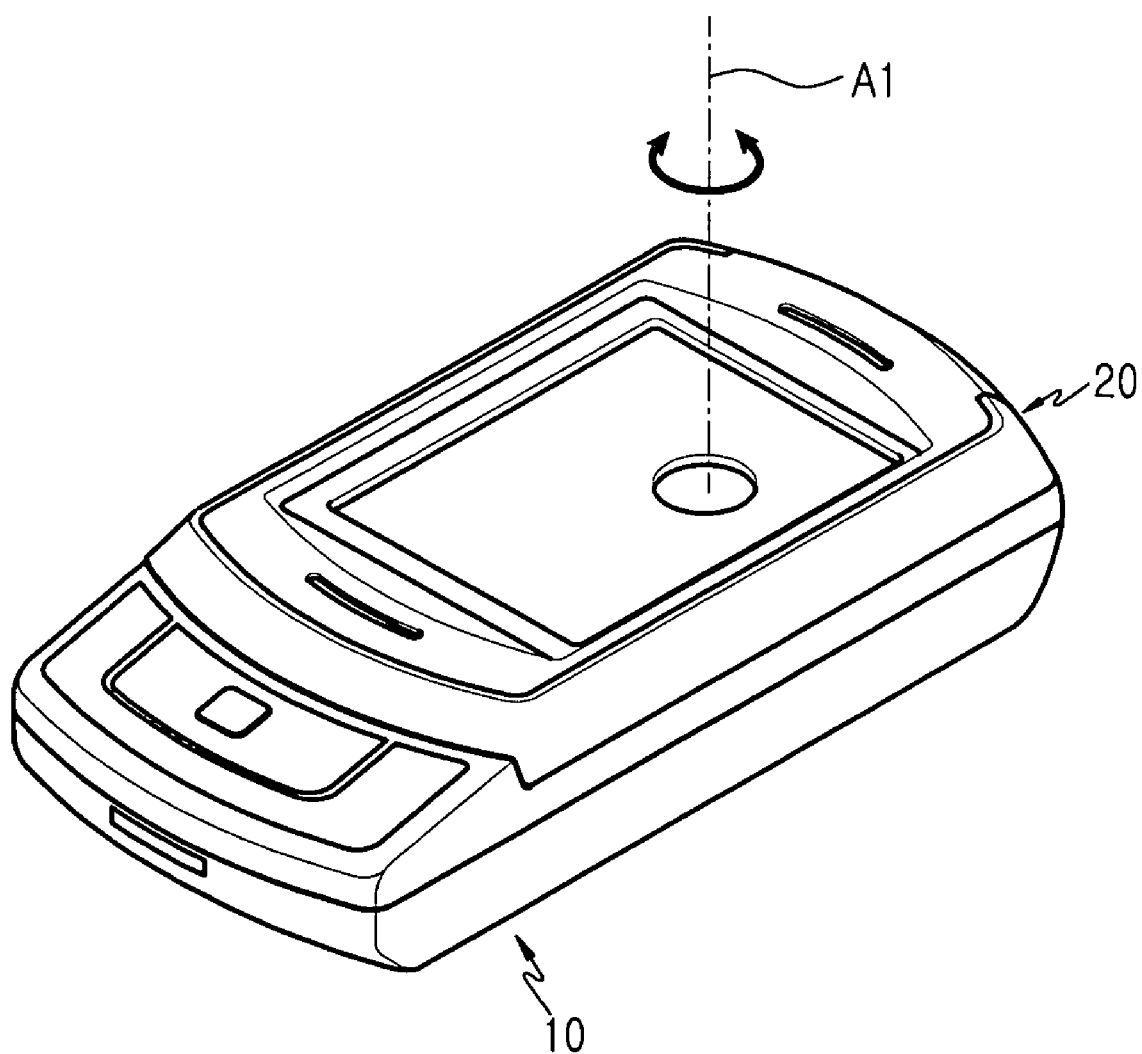
FIG. 5 is a perspective view illustrating a mobile terminal having a swing hinge device according to the preferred embodiment of the present invention when the second housing is not rotated.
Figure 7:
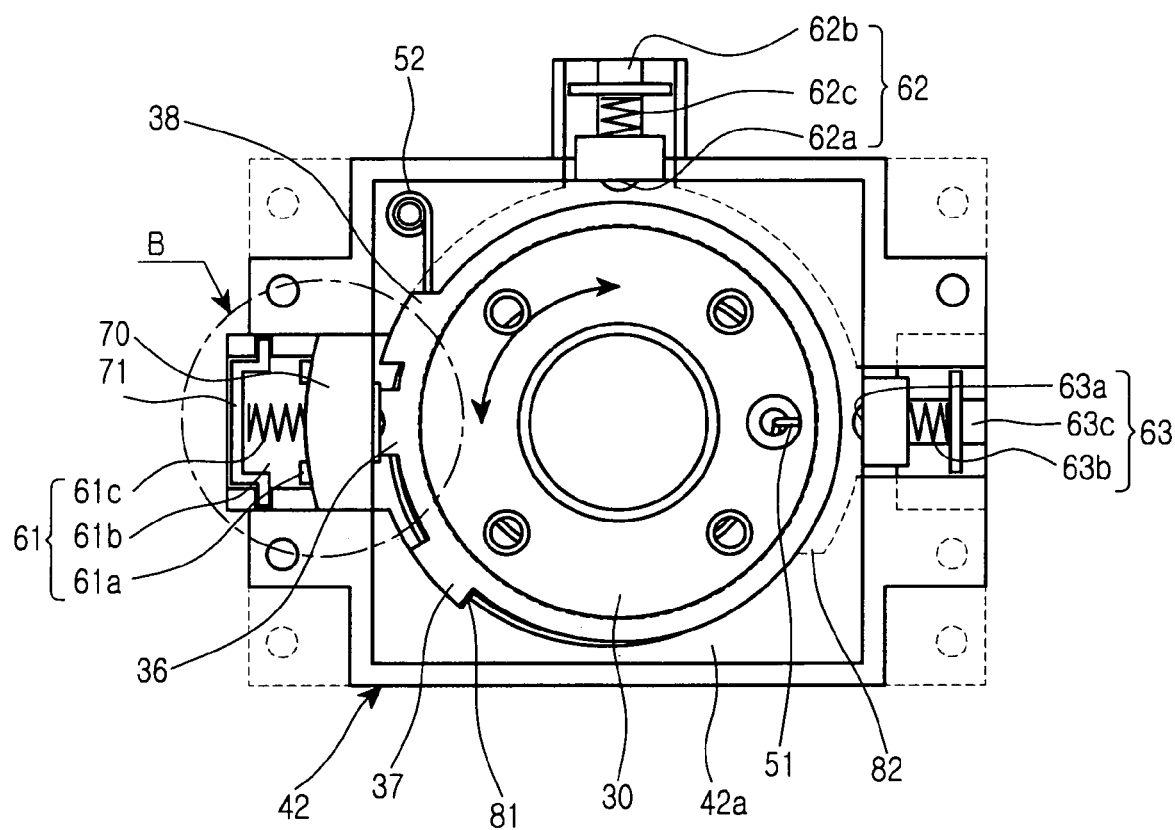
FIG. 7 is a plan view of a swing hinge device of a mobile terminal before rotation according to the preferred embodiment of the present invention.
Figure 8:
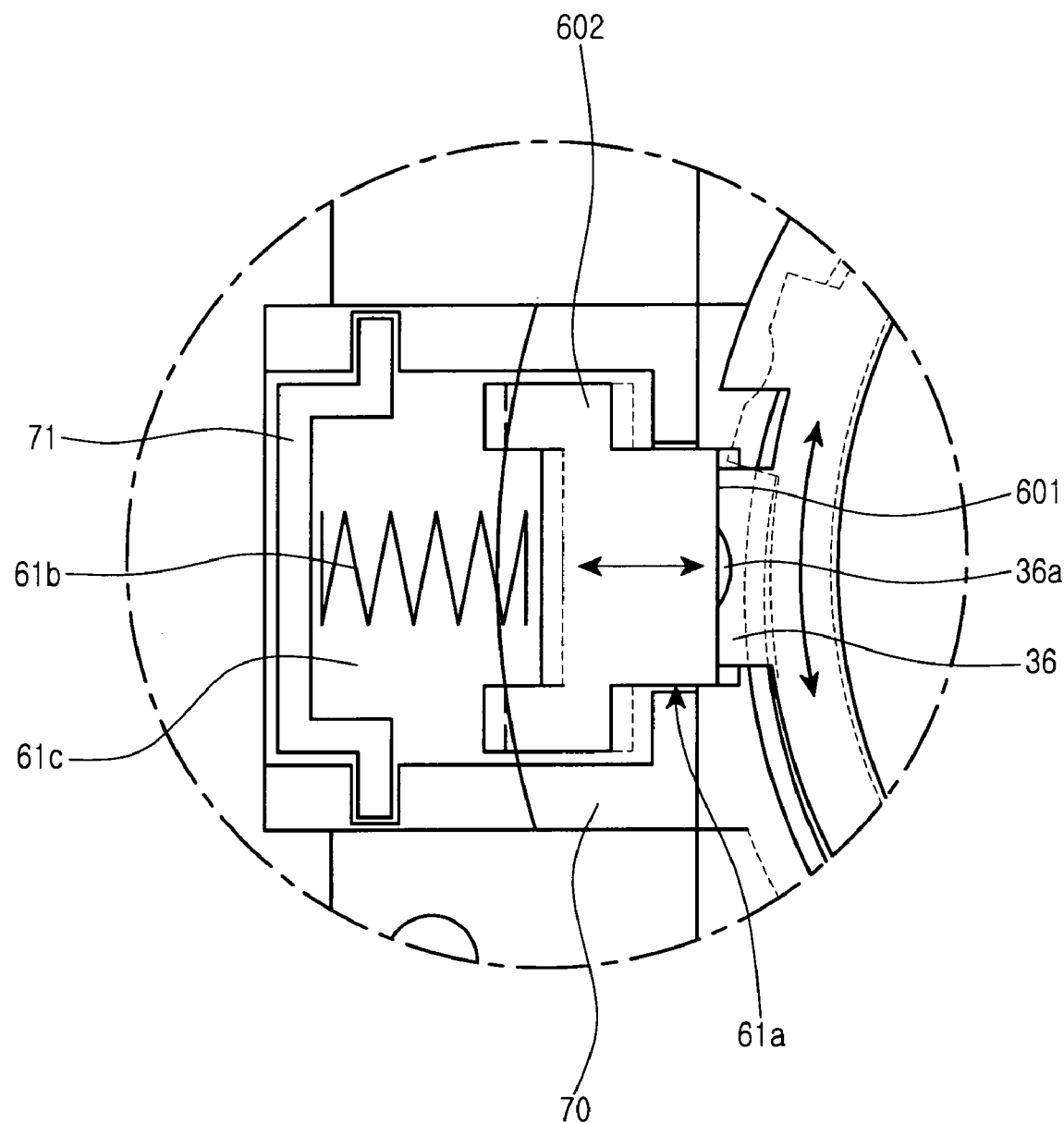
FIG. 8 is an enlarged plan view of part B in FIG. 7.

As illustrated in FIGS. 5, 7 and 8, the first locking means 61 is formed at the outer perimeter of the receiving space 42a of the second hinge member 42. When the second housing 20 is not rotated, the first locking means 61 contacts a locker 36 protruded outward from the circumference of the rotation member 30.

As illustrated in FIGS. 9 through 12, when the second housing 20 is rotated clockwise, the rotation member 30 rotates together. With the rotation of the rotation member 30, the locker 36 is released from the first locking means 61. At this time, the second housing 20 further rotates semi-automatically due to the elastic force generated from the spiral spring 50. The rotation of the second housing 20 is interrupted at 90° where the locker 36 is engaged with the second locking means 62 adjacent to the first locking means 61.

As illustrated in FIGS. 13 through 16, when the second housing 20 is further rotated in the same direction, the rotation member 30 rotates together, whereby the locker 36 is released from the second locking means 62. The second housing 20 semi-automatically rotates due to the elastic force from the spiral spring 50 and stops rotation at an angle of 180° where the locker 36 is engaged with the third locking means 63 adjacent to the second locking means 62. The rotation of the second housing 20 is interrupted every 90° angle by the three locking means.

As illustrated in FIG. 2, each of the first to third locking means 61 consists of a lock moving member 61a, 62a or 63a, a guide groove 61b, 62b or 63b and a coil spring 61c, 62c or 63c. The lock moving member 61a, 62a or 63a contacts the locker 36 of the rotation member 30. The lock moving member 61a, 62a or 63a is slidably movable along the guide groove 61b, 62b or 63b in a direction perpendicular to the hinge axis A1. The guide groove 61b, 62b or 63b is formed on the second hinge member 42 to allow the slidable movement of the lock moving member 61a, 62a or 63a mounted thereon. The coil spring 61c, 62c or 63c is also mounted on the guide groove 61b, 62b or 63b to generate an elastic force to slidably move the lock moving member 61a, 62a or 63a.

As illustrated in FIGS. 2 and 8, the lock moving member 61a of the first locking means 61 is formed in a cuboid shape. The lock moving member 61a has a contact portion 601 at one end contacting the locker 36 and a release preventing projection 602 at the other end thereof.

Figure 12:
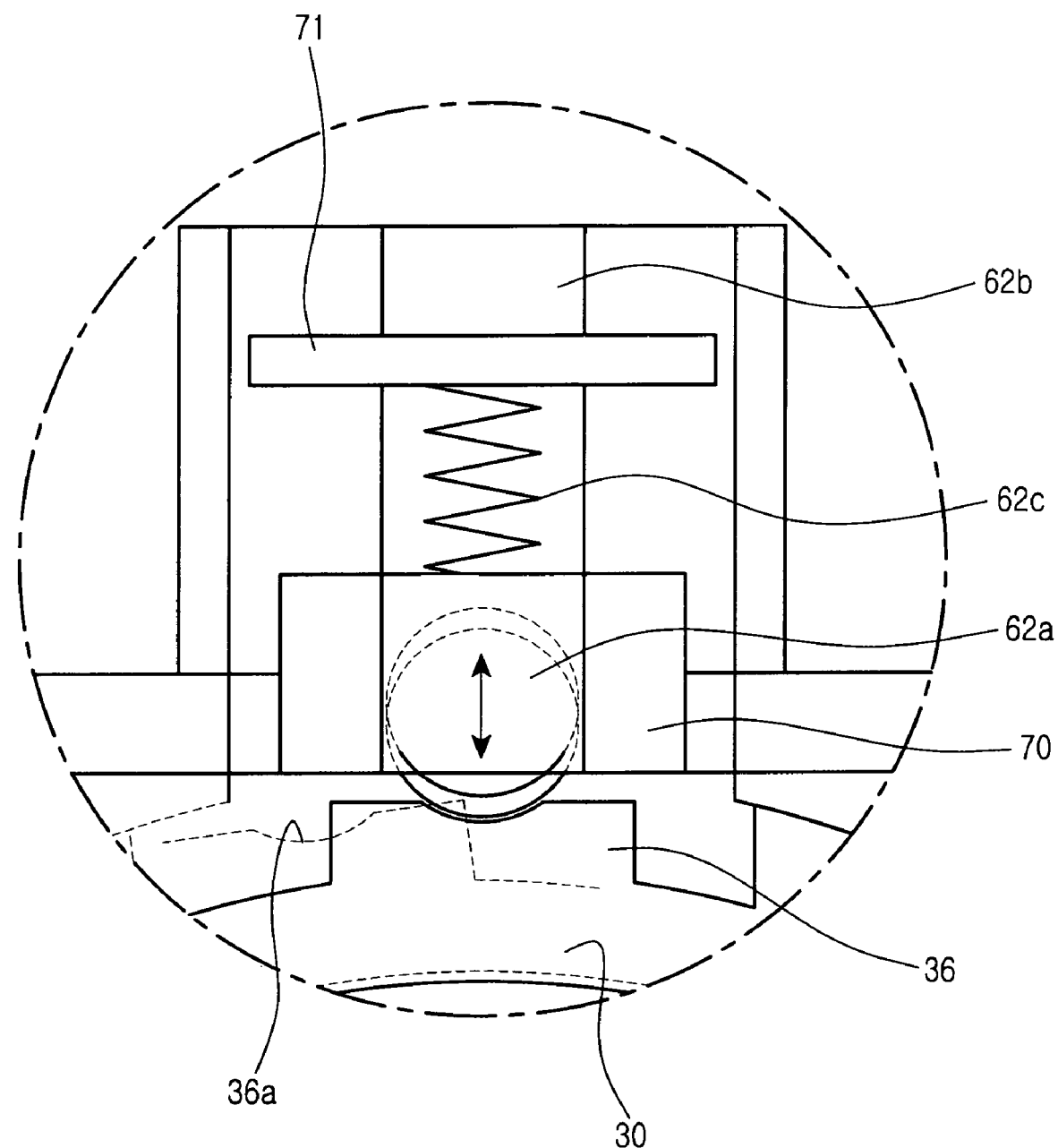
FIG. 12 is an enlarged plan view of part C in FIG. 11.
Figure 16:
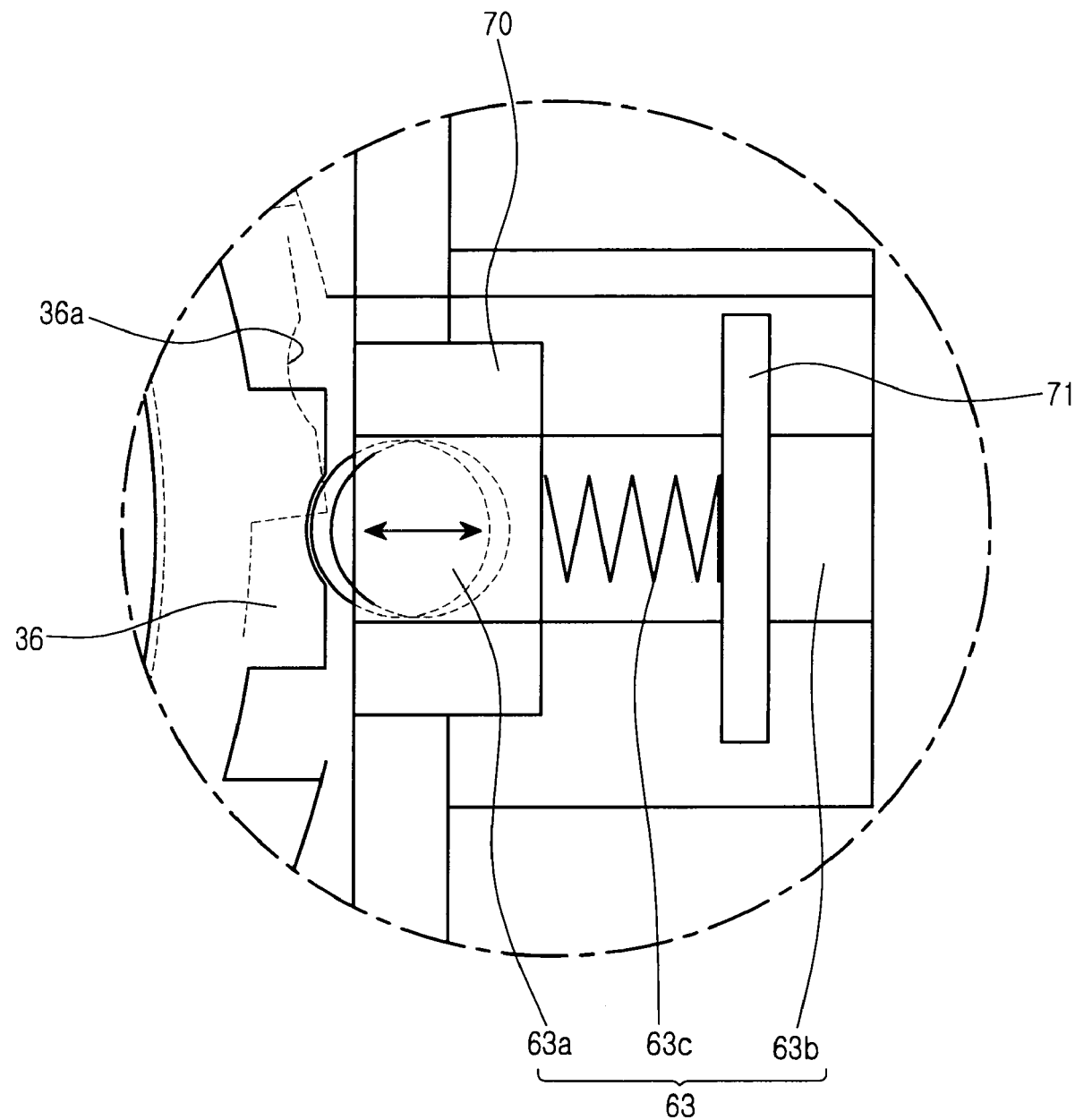
FIG. 16 is an enlarged plan view of part D in FIG. 15.

As illustrated in FIGS. 2, 12 and 16, the lock moving members 62a and 63a of the second and third locking means 62 and 63 are in a ball shape which can be easily engaged or disengaged with the locker 36.

As illustrated in FIG. 2, the guide groove 61b, 62b or 63b has, at one end thereof, a support member 70 having a hole 70a through which the lock moving member 61a, 62a or 63a is slightly protruded. The support member 70 supports the lock moving member 61a, 62a or 63a and prevents the lock moving member 61a, 62a or 63a from being released out. The guide groove 61b, 62b or 63b also has a spring support member 71 at the other end to support the coil spring 61c, 62c or 63c.

As illustrated in FIG. 7, the first to third locking means 61, 62 and 63 are spaced at equiangular intervals along the outer perimeter of the receiving space 42a of the second hinge member 42.

As illustrated in FIGS. 2 and 8, the locker 36 has a recess 36a into which the lock moving member 61a, 62a or 63a of the locking means 61, 62 or 63 can be inserted. The recess 36a is cut in a domelike shape to be smoothly engaged or disengaged with the ball-shaped lock moving member 61a, 62a or 63a.

Figure 4:
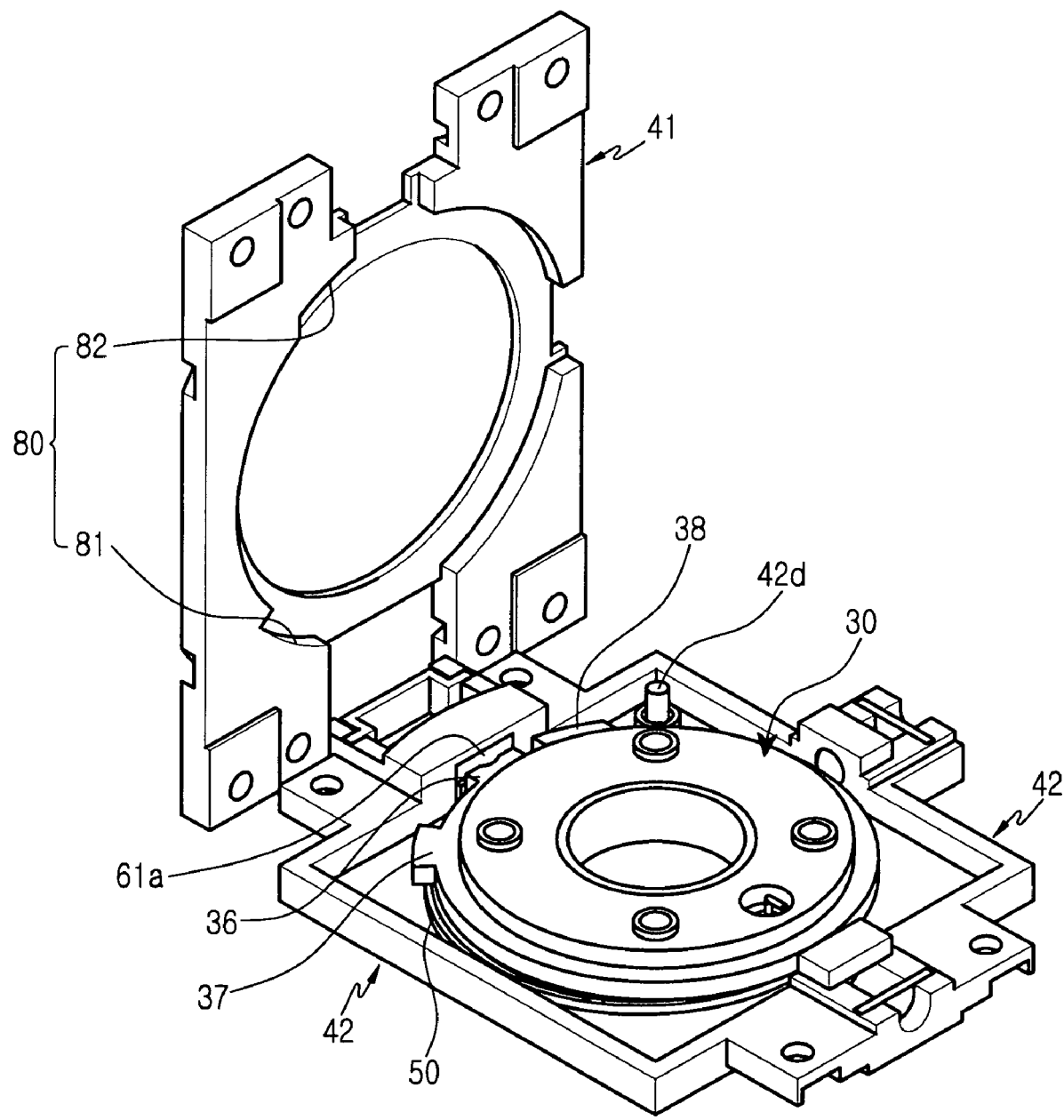
FIG. 4 is a perspective view illustrating a swing hinge device of a mobile terminal according to the preferred embodiment of the present invention before connection of first and second hinge members.

As illustrated in FIG. 4, the first hinge member 41 has a rotation stopper 80 which contacts first and second stopper projections 37 and 38 formed on the outer circumference of the rotation member 30 and thereby restricts the rotation of the rotation member 30.

Figure 11:
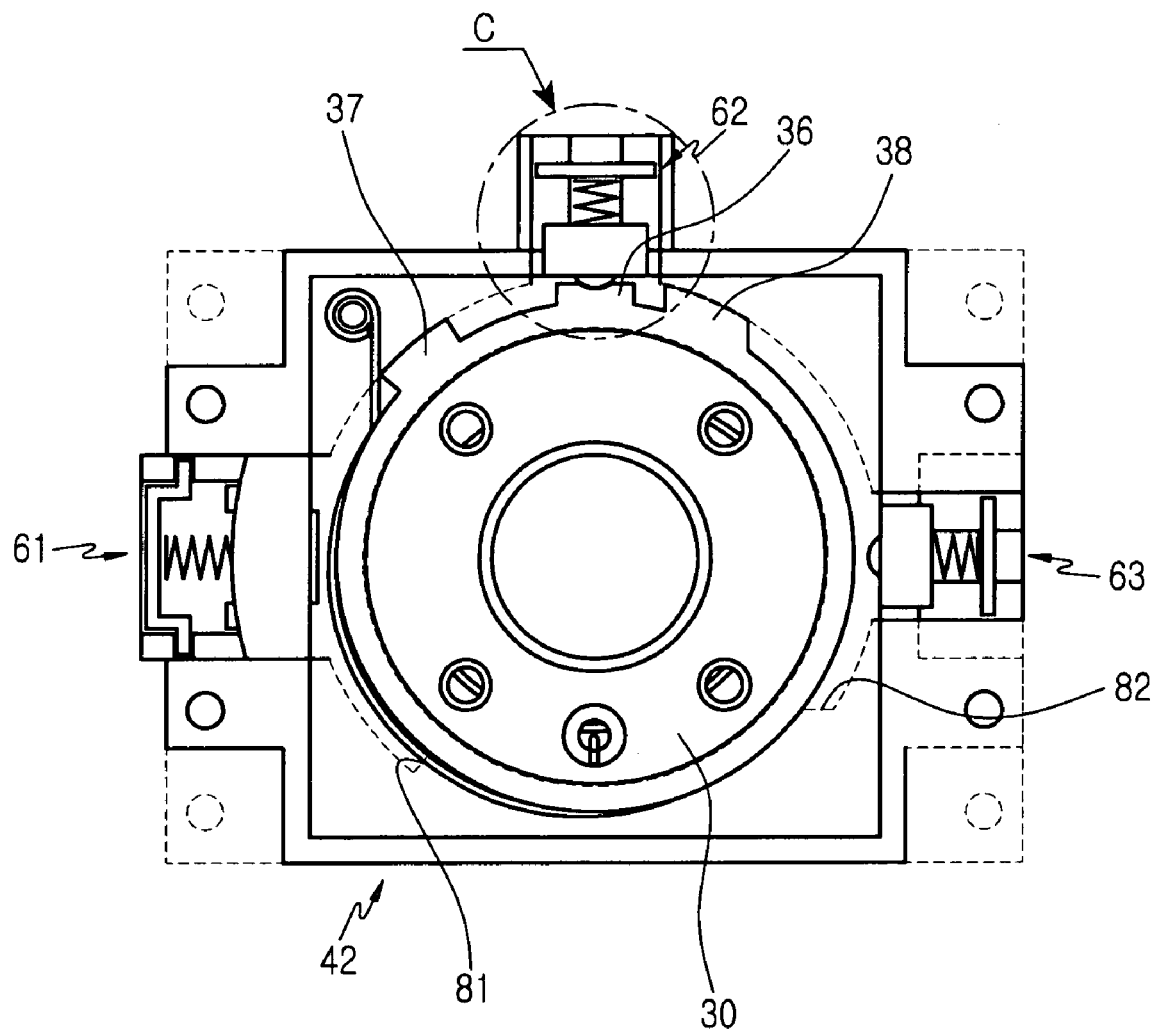
FIG. 11 is a plan view of a swing hinge device of the mobile terminal in FIG. 9.
Figure 15:
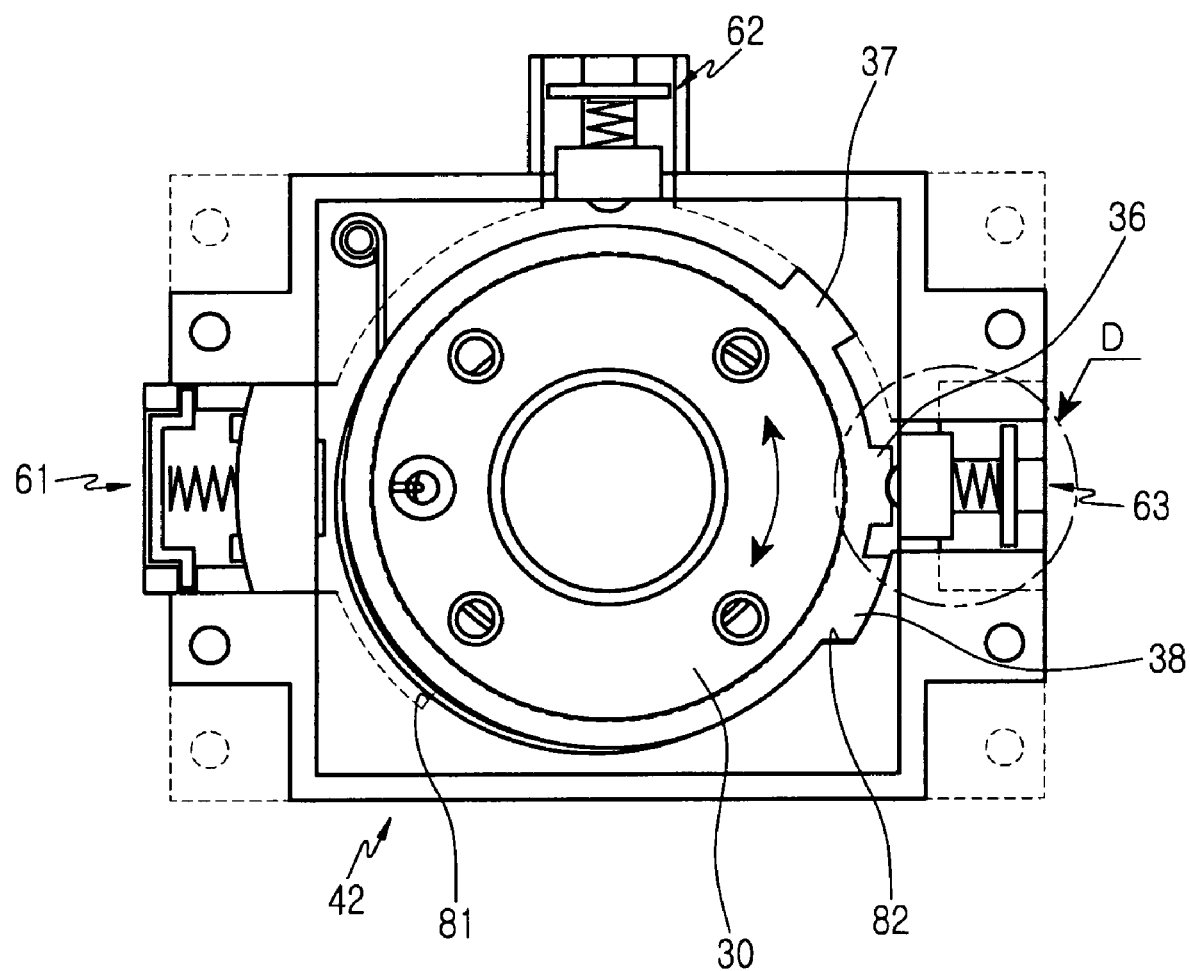
FIG. 15 is a plan view of a swing hinge device of the mobile terminal in FIG. 13.

As illustrated in FIGS. 7, 11 and 15, the rotation stopper 80 consists of first and second stopper portions 81 and 82. The first stopper portion 81 is formed at one end of the rotation stopper 80 to contact the first stopper projection 37 and maintain the rotation member 30 at its initial position before rotation. The second stopper portion 82 formed at the other end of the rotation stopper 80 contacts the second stopper projection 38 when the rotation member 30 is rotated 180° clockwise around the hinge axis A1 and thus restricts further rotation of the rotation member 30.

The operation of a swing hinge device for a mobile terminal according to a preferred embodiment of the present invention will be explained in more detail with reference to FIGS. 1 to 16.

As illustrated in FIGS. 1 and 2, the first hinge member 41 of the swing hinge member 40 has at least one first screw hole 41b to be fixed to the first housing 10 by screws 90.

As illustrated in FIG. 3, the first housing 10 has the rotation space 11 on the top surface thereof. The first housing 10 is longitudinally extended to be longer than the second housing 20.

As illustrated in FIG. 1, the rotation space 11 includes the mount groove 12 recessed in a plate shape at a predetermined location to a predetermined depth to mount the plate-type swing hinge member 40 thereon.

As illustrated in FIGS. 2 and 4, the swing hinge member 40 consists of plate-type first and second hinge members 41 and 42. The first hinge member 41 has the rotation hole 41a at the center thereof. The rotation member 30 is rotatably inserted into the rotation hole 41.

As illustrated in FIG. 6, the second hinge member 42 has the receiving space 42a for receiving the power supply means 50 (i.e., the spiral spring 50). The disc-shaped rotation member 30 is placed on the spiral spring 50 received in the receiving space 42a. One end 51 of the spiral spring 50 is inserted into the spring hole 35 formed on the rotation member 30, while the other end 52 is coupled to the spring fixing projection 42d formed in the receiving space 42a of the second hinge member 42.

At least one screw hole 42c which corresponds to the second screw hole 41d of the first hinge member 41 is formed at the outer perimeter of the receiving space 42a. The second hinge member 42 is connected to the first hinge member 41 by a screw 90 inserted into the screw hole 42c and the screw hole 41d.

At least one swing locking means 60 is formed along the perimeter of the second hinge member 42. With the rotation of the rotation member 30, the locker 36 of the rotation member 30 is engaged or disengaged with the swing locking means 60. Accordingly, the rotation member 30 rotates on a step-by-step basis with locking occurring between each step.

The rotation member 30 has at least one screw hole 33 to be connected to the second housing 20 by screws 90.

Figure 9:
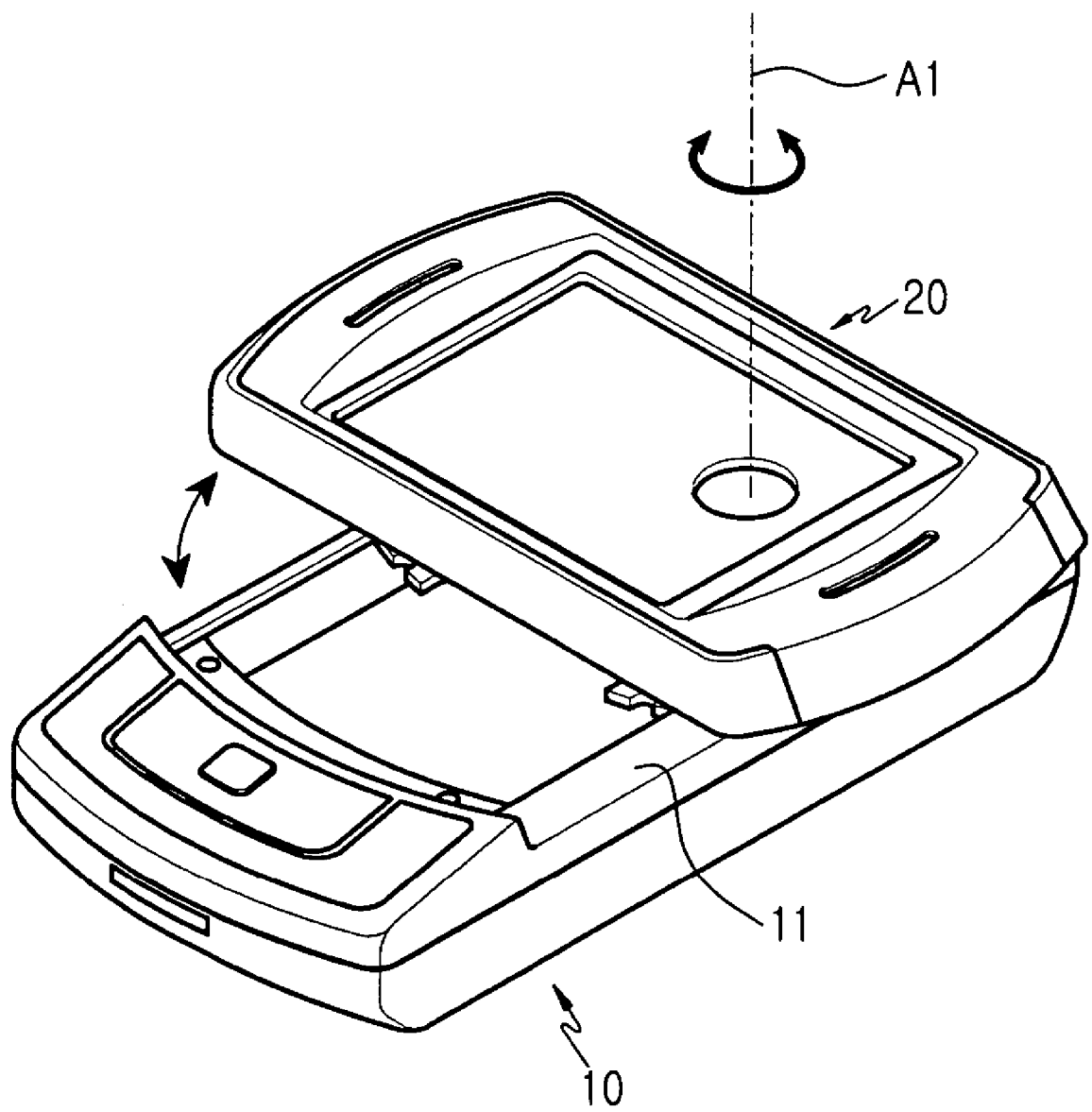
FIG. 9 is a perspective view illustrating a mobile terminal having a swing hinge device according to the preferred embodiment of the present invention when the second housing is rotated 90°.
Figure 10:
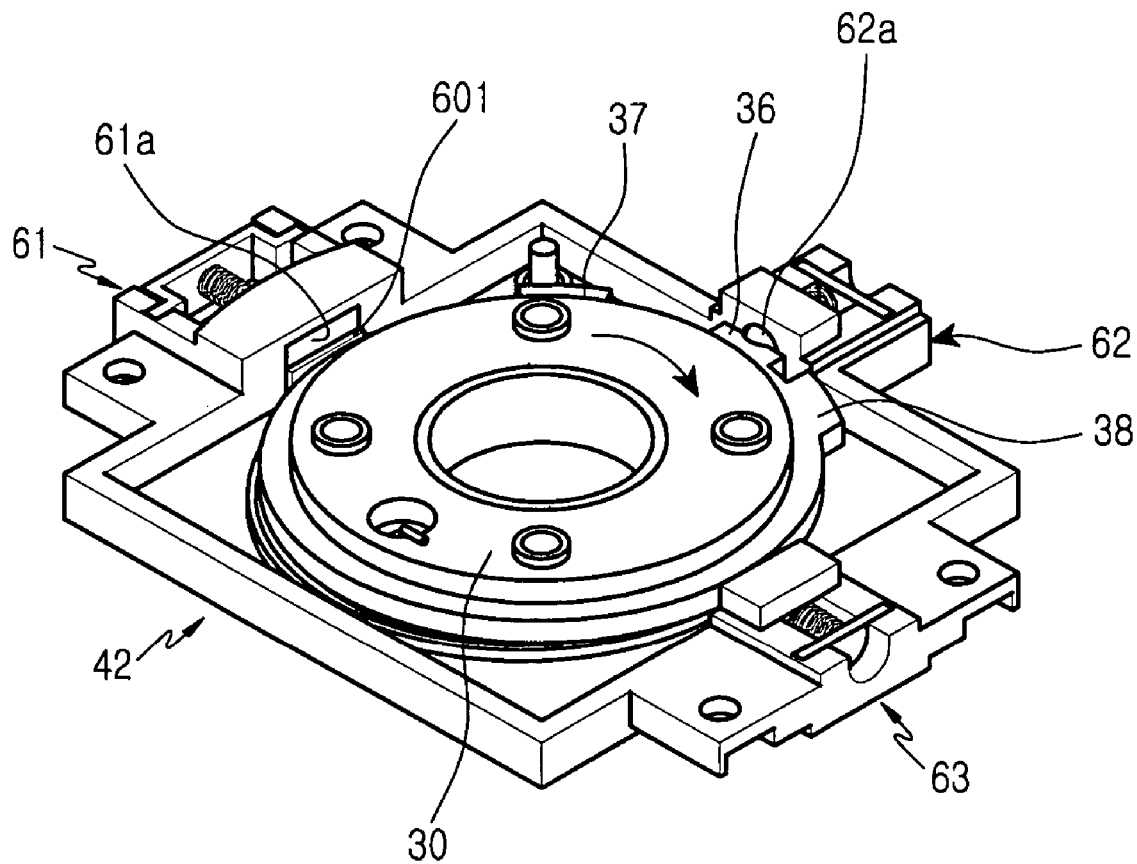
FIG. 10 is an enlarged perspective view of a swing hinge device of the mobile terminal in FIG. 9.

As illustrated in FIGS. 9 and 10, when the second housing 20 is rotated clockwise around the hinge axis A1 perpendicular to the length of the first housing 10, the rotation member 30 also rotates in the same direction.

As illustrated in FIG. 11, with the rotation of the rotation member 30, the locker 36 formed at the periphery of the rotation member 30 is released from the lock moving member 61a of the first locking means 61. At this time, the second housing 20 semi-automatically rotates due to the elastic force generated from the spiral spring 50 until the locker 36 is moved to the second locking means 62.

As illustrated in FIGS. 11 and 12, when the locker 36 contacts the lock moving member 62a of the second locking means 62, the lock moving member 62a slides back along the guide groove 62b and is then inserted into the recess 36a at the center of the locker 36. The lock moving member 62a can slide back and forth due to the elastic force from the coil spring 62c mounted on the guide groove 62b. The lock moving member 62a slides back along the guide groove 62b when the locker 36 contacts it. The lock moving member 62a then slides forth due to the elastic force from the coil spring 62c to be inserted into the recess 36a of the locker 36.

Accordingly, the rotation of the second housing 20 is stopped at 90° as illustrated in FIG. 9.

At this time, the mobile terminal with the second housing 20 rotated 90° is "¬"shaped.

Figure 13:
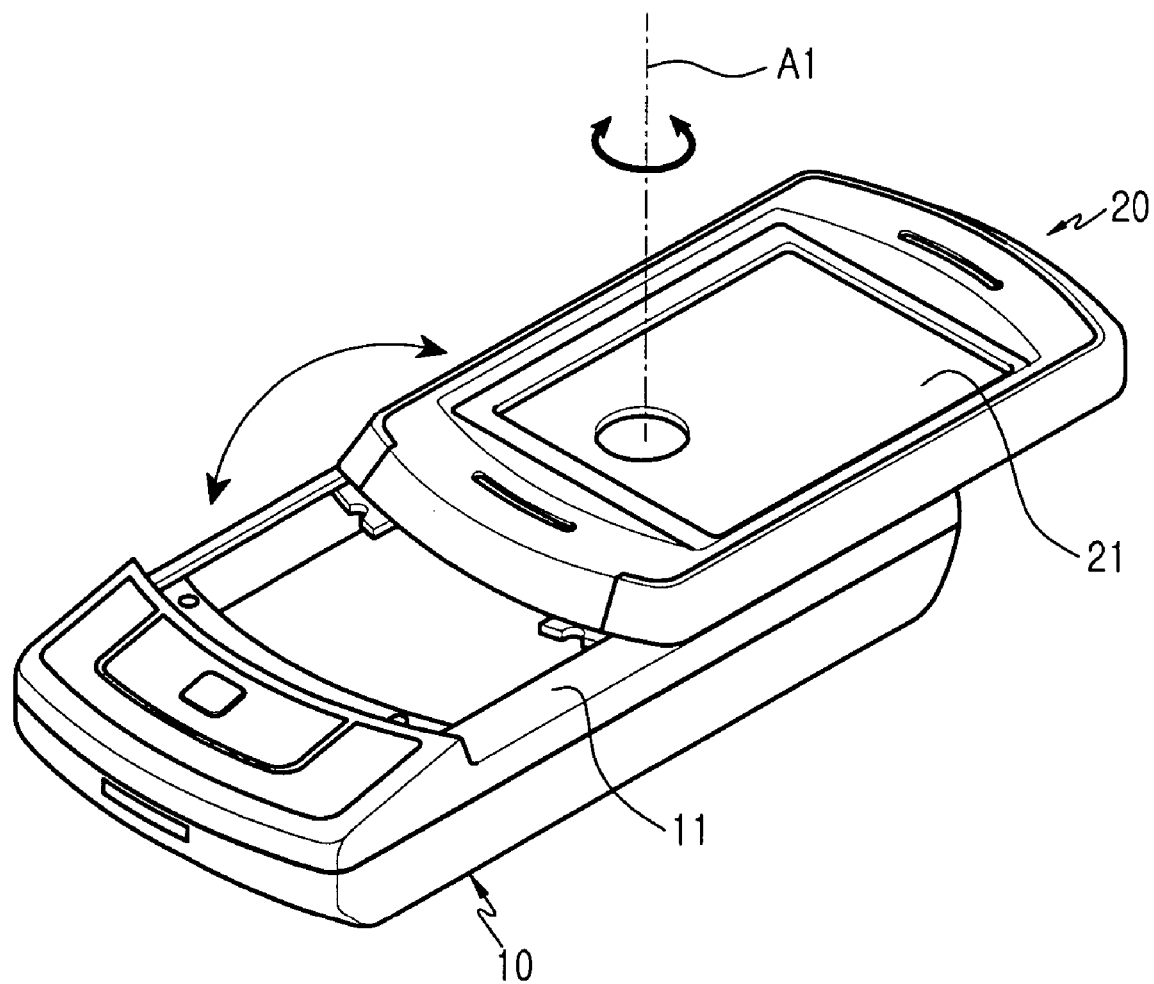
FIG. 13 is a perspective view illustrating a mobile terminal having a swing hinge device according to the preferred embodiment of the present invention when the second housing is rotated 180°.

As illustrated in FIG. 13, when the second housing 20 is further rotated in the same direction, the rotation member 30 rotates together, whereby the locker 36 is released from the second locking means 62. The second housing 20 semi-automatically rotates due to the elastic force from the spiral spring 50 and stops rotation at an angle of 180° where the locker 36 is engaged with the third locking means 63.

Figure 14:
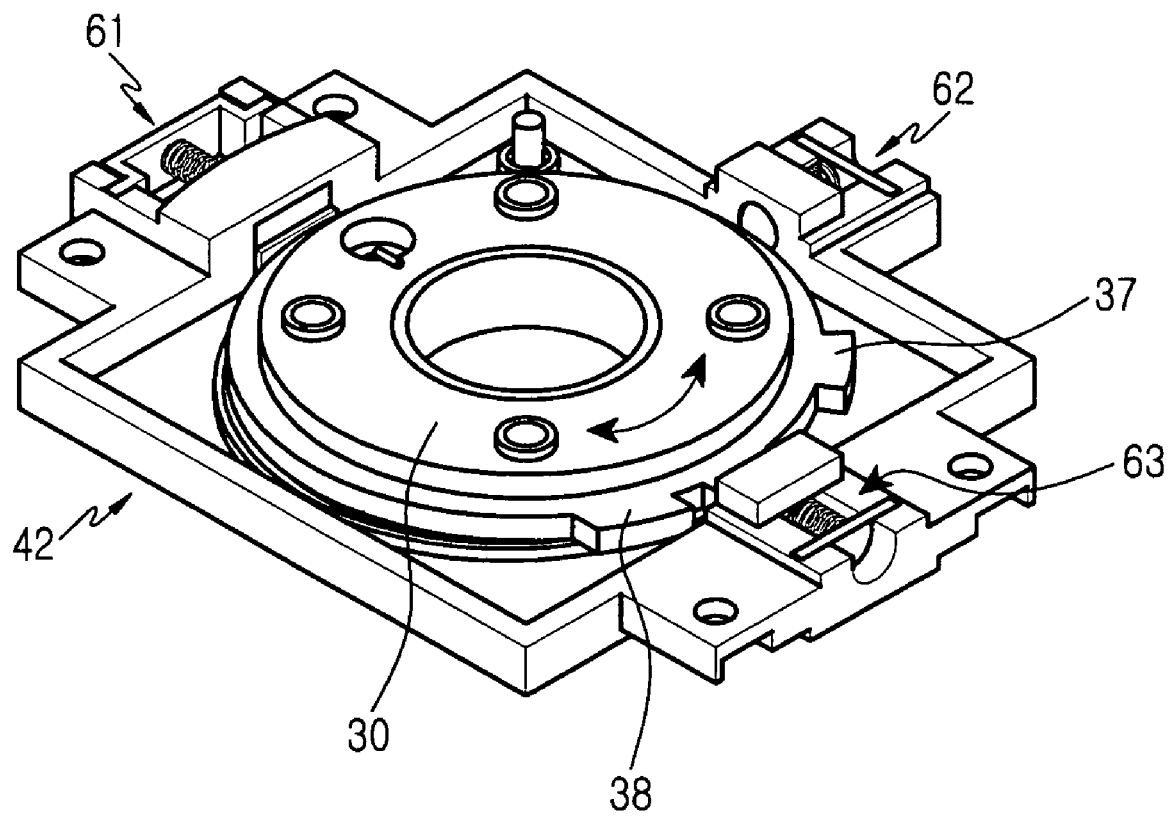
FIG. 14 is an enlarged perspective view of a swing hinge device of the mobile terminal in FIG. 13.

As illustrated in FIGS. 14 and 15, the locker 36 is released from the lock moving member 62a of the second locking means 62 and moved to be engaged with the lock moving member 63a of the third locking means 63.

The lock moving member 63a slides back along the guide groove 63b when the locker 36 contacts it. The lock moving member 63a then slides forth due to the elastic force from the coil spring 63c to be inserted into the recess 36a of the locker 36.

Accordingly, the rotation of the second housing 20 is stopped at 180°.

As illustrated in FIG. 15, the second stopper portion 82 formed on the first hinge member 41 prevents the rotation of the rotation member 30 over 180°. When the rotation member 30 rotates 180°, the second stopper projection 38 formed at the periphery of the rotation member 30 contacts the second stopper portion 82, thereby restricting further rotation of the rotation member 30.

At this time, the 180° rotated second housing is placed in the longitudinal direction on the first housing.

When the user rotates the second housing 20 180° clockwise at once around the hinge axis A1 as illustrated in FIG. 13, the locker 36 of the rotation member 30 passes over the lock moving member 62a of the second locking means 62 and moves to the lock moving member 63a of the third locking means 63. The locker 36 of the rotation member 30 is stopped where the lock moving member 63a is inserted into the recess 38a of the locker 36. The second housing 20 can be rotated 180° at once by the elastic force from the spiral spring 50.

The second and third locking means 62 and 63 are formed in a ball shape which can be smoothly inserted into or released from the recess 36a of the locker 36.

The recess 36a of the locker 36 is cut in a domelike shape to be smoothly engaged or disengaged with the ball-shaped lock moving members 62a and 63a.

The support member 70 formed at one end of the guide groove 61b, 62b or 63b prevents the lock moving member 61a, 62a or 63a from being released from the guide grooves 61b, 62b and 63b.

The support member 70 has a hole 70a through which the lock moving member 61a, 62a or 63a is slightly protruded to contact the locker 36 or to be inserted into the recess 36a of the locker 36.

In order to place the second housing 20 at the initial position on the first housing 10 as illustrated in FIG. 5, the user has to rotate the second housing 20 counterclockwise around the hinge axis A1. With the rotation of the second housing 20, the rotation member 30 also rotates counterclockwise. The locker 36 is released from the lock moving member 63a of the third locking means 63 and moved to the lock moving member 62a of the second locking means 62. The rotation of the second housing 20 is stopped at 90° where the locker is engaged with the lock moving member 62a of the second locking means 62.

When the second housing 20 is further rotated counterclockwise, the rotation member 30 rotates together, whereby the locker 36 moves to the lock moving member 61a of the first locking means 61. When the locker 36 contacts, the lock moving member 61a slides back along the guide groove 61b. The lock moving member 61a then slides forth due to the elastic force from the coil spring 61c so that the contact portion 601 formed at the front end of the lock moving member 61a can contact the locker 36 and restrict further rotation of the rotation member 30.

The release preventing projection 602 formed at the rear end of the lock moving member 61a is caught by the support member 70, thereby preventing the lock moving member 61a from being released out from the guide groove 61b.

The first stopper projection 37 formed at the outer circumference of the rotation member 30 is caught by the first stopper portion 81 so that further counterclockwise rotation of the rotation member 30 can be restricted.

The locker 36 contacts the contact portion 601 of the lock moving member 61a to maintain the second housing 20 at its initial position facing the first housing 10.

When the user rotates the second housing 20 180° counterclockwise at once, the locker 36 of the rotation member 30 is released sequentially from the third and second locking means 63 and 62 and moved to the first locking means 61 to locate the second housing 20 at its initial position.

As explained above, the plate-type swing hinge module of the present invention semi-automatically rotates the second housing on a step-by-step basis, which facilitates the open/close operation of the mobile terminal. Also, the plate-type swing hinge module can reduce the size and thickness of the mobile terminal.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. In a mobile terminal having a first housing and a second housing with a display unit rotatable around a hinge axis extending in a direction perpendicular to a top surface of the first housing, a swing hinge device comprising:
    a rotation member rotatable around the hinge axis;
    a plate-type swing hinge member connected to the rotation member to semi-automatically rotate the rotation member;
    a power supply means mounted in the swing hinge member to supply power for semi-automatically rotating the rotation member; and
    at least one swing locking means formed along the perimeter of the swing hinge member to lock or release the rotation member for the step-by-step interrupted rotation of the rotation member,
    wherein said swing hinge member consists of plate-type first and second hinge members, and
    wherein said second hinge member comprises:
    a receiving space for receiving the power supply means;
    a cylindrical housing protruded at the center thereof to be inserted into a through hole of the rotation member; and
    at least one fixing means formed at the outer perimeter of the receiving space to correspond to the second fixing means of the first hinge member and connect the first and second hinge members.

2. The swing hinge device as claimed in claim 1, wherein said first housing is longitudinally extended to be longer than the second housing and has a rotation space on the top surface thereof to allow the second housing to rotate thereon, said rotation space including a mount groove recessed in a plate shape to a predetermined depth to mount the plate-type swine hinge member therein.

3. The swing hinge device as claimed in claim 1, wherein said rotation member is formed in a disc shape and has the through hole at the center thereof into which the swing hinge member is inserted, a release preventing step at the outer periphery of the swing hinge member to prevent the rotation member rotatably inserted into a rotation hole of the swing hinge member from being released therefrom, said rotation member and connected to the second housing.

4. The swing hinge device as claimed in claim 1, wherein said rotation member has a cylindrical rib protruded downward from the bottom thereof to be connected to the swing hinge member and to provide a space for receiving the power supply means.

5. The swing hinge device as claimed in claim 1, wherein said plate-type first hinge member comprises:
    a rotation hole formed at the center thereof into which the rotation member is rotatably inserted;
    at least one first fixing means formed at the outer perimeter of the rotation hole to fix the first hinge member to the mount groove of the first housing;
    at least one second fixing means formed at a position adjacent to the first fixing means and corresponding to a fixing means of the second hinge member to connect the first and second hinge members; and
    at least one guide groove into which a guide projection formed on the button surface of the second housing is engaged so that the second housing can rotate according to the guidance thereof.

6. The swing hinge device as claimed in claim 1, wherein said power supply means is a spiral spring having one end inserted into a spring hole formed on the rotation member and the other end coupled to a spring fixing projection formed in the receiving space of the second hinge member.

7. The swing hinge device as claimed in claim 1, wherein said swing locking means comprises:
    a first locking means contactable with a locker protruded outward from the circumference of the rotation member;

a second locking means contactable with the locker released from the first locking means and thereby interrupting the rotation of the second housing at a rotary angle of 90°, said locker being released from the first locking means with the rotation of the second housing and the rotation member and making the second housing semi-automatically rotate due to the elastic force from the spiral spring; and a third locking means contactable with the locker released from the second locking means and thereby interrupting the rotation of the second housing at a rotary angle of 180°, said locker being released from the second locking means with further rotation of the second housing and the rotation member in the same direction and making the second housing semi-automatically rotate due to the elastic force from the spiral spring.

8. The swing hinge device as claimed in claim 7, wherein each of said first to third locking means comprises:

a lock moving member contactable with the locker of the rotation member and slidably movable in a direction perpendicular to the hinge axis;

a guide groove mounting the lock moving member to be slidably movable thereon; and a coil spring mounted on the guide groove to generate an elastic force for slidably moving the lock moving member.

9. The swing hinge device as claimed in claim 7, wherein said lock moving member of the first locking means is formed in a cuboid shape having a contact portion at one end contacting the locker and a release preventing projection at the other end thereof to prevent the lock moving member from being released out from the guide groove.

10. The swing hinge device as claimed in claim 7, wherein the lock moving members of said second and third locking means are both in a ball shape.

11. The swing hinge device as claimed in claim 8, wherein said guide groove has, at one end thereof, a support member having a hole through which the lock moving member is slightly protruded and, at the other end, a spring support member for supporting the coil spring.

12. The swing hinge device as claimed in claim 8, wherein said first to third locking means are spaced at equiangular intervals along the outer perimeter of the receiving space of the second hinge member.

13. The swing hinge device as claimed in claim 7, wherein said locker has a recess into which the lock moving member of each locking means can be inserted, said recess being cut in a domelike shape.

14. The swing hinge device as claimed in claim 1, wherein said first hinge member has a rotation stopper contactable with first and second stopper projections formed on the outer circumference of the rotation member and thereby restricts the rotation of the rotation member.

15. The swing hinge device as claimed in claim 14, wherein said rotation stopper consists of a first stopper portion formed at one end thereof to contact the first stopper projection and maintain the rotation member at its initial position before rotation and a second stopper portion formed at the other end to contact the second stopper projection when the rotation member is rotated 180° around the hinge axis A1 and thereby restrict further rotation of the rotation member.

16. The swing hinge device as claimed in claim 7, wherein said locker of the rotation member passes over the second locking means when the second housing is rotated 180° at once around the hinge axis by the elastic force from the spiral spring, and is engaged with the second locking means when the second housing is rotated in a reverse direction around the hinge axis, thereby stopping the rotation of the second housing at 90°.

* * * * *